United States Patent
Watkins

(10) Patent No.: US 11,947,032 B2
(45) Date of Patent: Apr. 2, 2024

(54) RADAR LIMITER DISTORTION CANCELLATION

(71) Applicant: Kabushiki Kaisha Toshiba, Tokyo (JP)

(72) Inventor: Gavin Watkins, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 213 days.

(21) Appl. No.: 17/305,272

(22) Filed: Jul. 2, 2021

(65) Prior Publication Data

US 2023/0003832 A1 Jan. 5, 2023

(51) Int. Cl.
   G01S 7/03 (2006.01)
   G01S 13/95 (2006.01)

(52) U.S. Cl.
   CPC ............. G01S 7/038 (2013.01); G01S 13/95 (2013.01)

(58) Field of Classification Search
   None
   See application file for complete search history.

(56) References Cited

U.S. PATENT DOCUMENTS

| | | | | |
|---|---|---|---|---|
| 9,820,311 | B2 * | 11/2017 | Khandani | H04B 1/525 |
| 10,218,490 | B1 * | 2/2019 | Yang | H04L 5/1461 |
| 10,644,763 | B1 | 5/2020 | Watkins | |
| 10,649,067 | B1 * | 5/2020 | Yang | G01S 7/038 |
| 2016/0112226 | A1 * | 4/2016 | Martinez | H03C 3/12 |
| | | | | 455/110 |
| 2016/0266245 | A1 * | 9/2016 | Bharadia | G01S 7/038 |
| 2017/0358857 | A1 | 12/2017 | Watkins | |

FOREIGN PATENT DOCUMENTS

| | | |
|---|---|---|
| CN | 110462431 A | 11/2019 |
| JP | 61-067312 A | 4/1986 |
| JP | 2007-170845 A | 7/2007 |

(Continued)

OTHER PUBLICATIONS

Leong et al., "A Radar Target Transceiver Using a Full Duplex Capable Retrodirective Array System", IEEE MTT-S International Microwave Symposium Digest, vol. 2, 2003, pp. 1447-1450, doi: 10.1109/MWSYM.2003.1212645.

(Continued)

*Primary Examiner* — Whitney Moore
(74) *Attorney, Agent, or Firm* — Oblon, McClelland, Maier & Neustadt, L.L.P.

(57) ABSTRACT

A full duplex radio apparatus comprising: a transmit path configured to transmit a first signal; a receive path configured to receive a received signal; a near-receive path for observing a first period of the received signal; a far-receive path for observing a second period of the received signal, the far-receive path comprising a radio frequency limiter; a self-interference cancellation circuit coupled between the transmit path and the near receive path; a variable impedance component; and a directional coupler comprising a first port, a second port, a third port, and a fourth port, wherein: the first port is coupled to the receive path; the second port is coupled to the radio frequency limiter of the far-receive path; the third port is coupled to the self-interference cancellation circuit; and the fourth port is coupled to the variable impedance component.

15 Claims, 10 Drawing Sheets

(56) References Cited

FOREIGN PATENT DOCUMENTS

Figure 1:
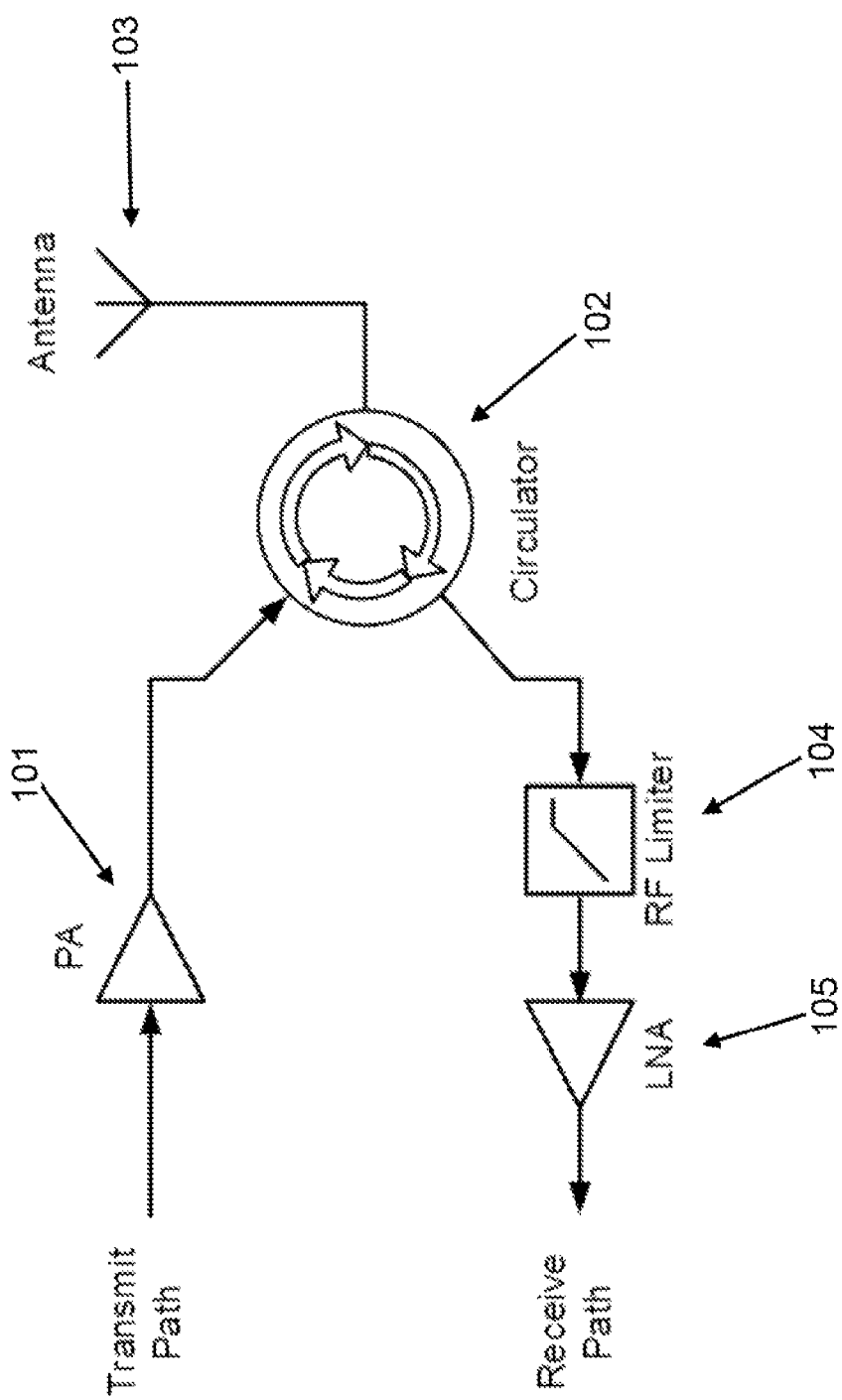

JP          2014-115095  A      6/2014
JP          2019-219314  A     12/2019

OTHER PUBLICATIONS

Hassani et al., "In-Band Full-Duplex Radar-Communication System", IEEE Systems Journal, vol. 15, No. 1, Mar. 2021, 12 pages, doi: 10.1109/JSYST.2020.2992689.

Pan et al., "A Digitally-Assisted Self-Interference Cancellation for Full-Duplex Phased Array Radar", 2019 IEEE International Symposium on Signal Processing and Information Technology (ISSPIT), 2019, pp. 1-5, doi: 10.1109/ISSPIT47144.2019.9001847.

Bensmida et al., "New High Directivity Coupler Design Using Feed-forward Compensation Technique", 2008 $38^{th}$ European Microwave Conference, 2008, 5 pages, doi: 10.1109/EUMC.2008.4751420.

Haupt et al., "High-directivity microstrip directional couplers", Electronics Letters, vol. 10, No. 9, May 2, 1974, pp. 142-143.

\* cited by examiner

RADAR LIMITER DISTORTION CANCELLATION

FIELD

Embodiments described herein relate to a full duplex radio apparatus.

BACKGROUND

Full Duplex (FD) communication is the Simultaneous Transmission And Reception (STAR) of wireless signals on the same frequency at the same time. Full Duplex (FD) technologies have a range of applications. For example, Full Duplex (FD) technologies have been approved as an option for the 802.11ax WiFi standard. Of particular interest is the use of Full Duplex (FD) technologies in radars, in particular in weather radars due to the operating environment being relatively static.

A known Full Duplex (FD) weather radar detects weather features (e.g. cloud formations) and comprises two receiver paths, one receiver path for detecting near objects less than a predetermined distance (referred to herein as the near receive path) and another receiver path for detecting objects greater than the predetermined distance (referred to herein as the far receive path). In this known system it is only necessary to implement Full Duplex (FD) communications for the near receive path since signals (e.g. caused by reflections) are received while the transmit pulse is still being transmitted.

A known challenge with Full Duplex (FD) technologies is achieving sufficient cancellation of self-interference. Self-interference arises in Full Duplex (FD) technologies when a high power transmit signal leaks into the receiver path. Achieving sufficient Self-Interference Cancellation (SiC) enables the detection of the desired signal (e.g. a reflection from a distant object), which has a power many orders of magnitude (100+dB) lower than the signal being transmitted.

For weather radars self-interference cancellation of around 158 decibels (dB) is required between transmit and receive paths due to large transmit powers of around 100 Watts (W). Furthermore, some weather radars have even greater transmit powers, in the order of Kilowatts, so higher Self-Interference Cancellation could be required.

One way to achieve Self-Interference Cancellation (SiC) is to use a combination of Radio Frequency (RF) cancellation and digital baseband cancellation. Radio Frequency (RF) cancellation occurs prior to the received signal entering a low noise amplifier (LNA). Radio Frequency (RF) cancellation often involves adjusting the amplitude and phase of the signal being transmitted in order to produce an approximate replica of the self-interference in the analogue domain. This signal is then used to (at least partially) cancel the self-interference present in the received signal. However, self-interference is not the only form of distortion that arises in Full Duplex (FD) systems.

Both the near receive path and the far receive path include limiters to prevent overload and damage to their low noise amplifiers (LNA). Limiters are non-linear components that are often, but not exclusively, implemented using diodes. Limiters often introduce distortion in the received signal. This distortion cannot by cancelled by using Radio Frequency (RF) Self-Interference Cancellation (SiC) because the distortion is not related to the signal that appears in the transmit path (which is subsequently used by the Self-Interference Cancellation filter to generate a cancellation signal).

In light of this there is a need to reduce the effect of limiter distortion in Full Duplex (FD) communication systems.

Figure 2:
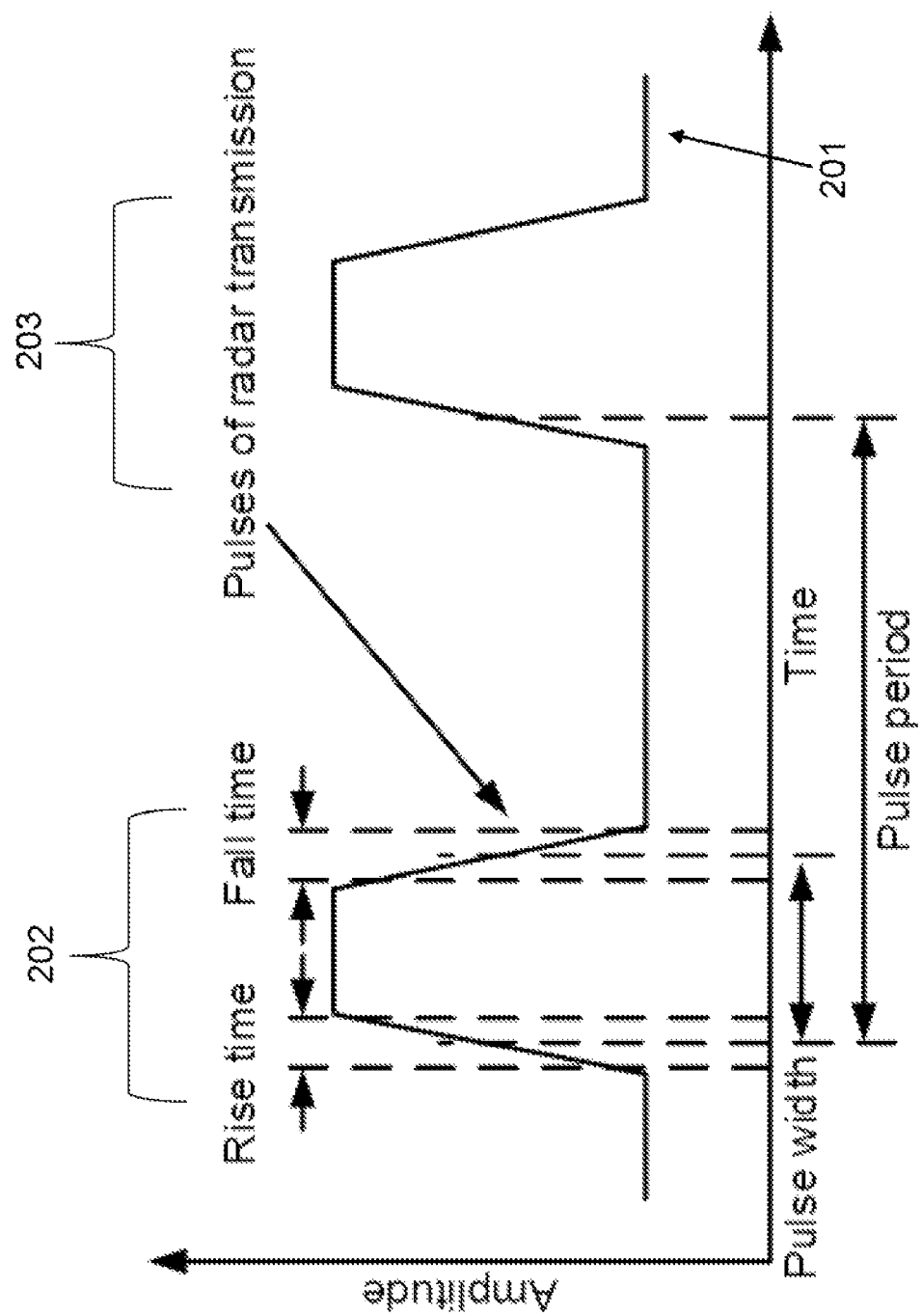
Figure 3:
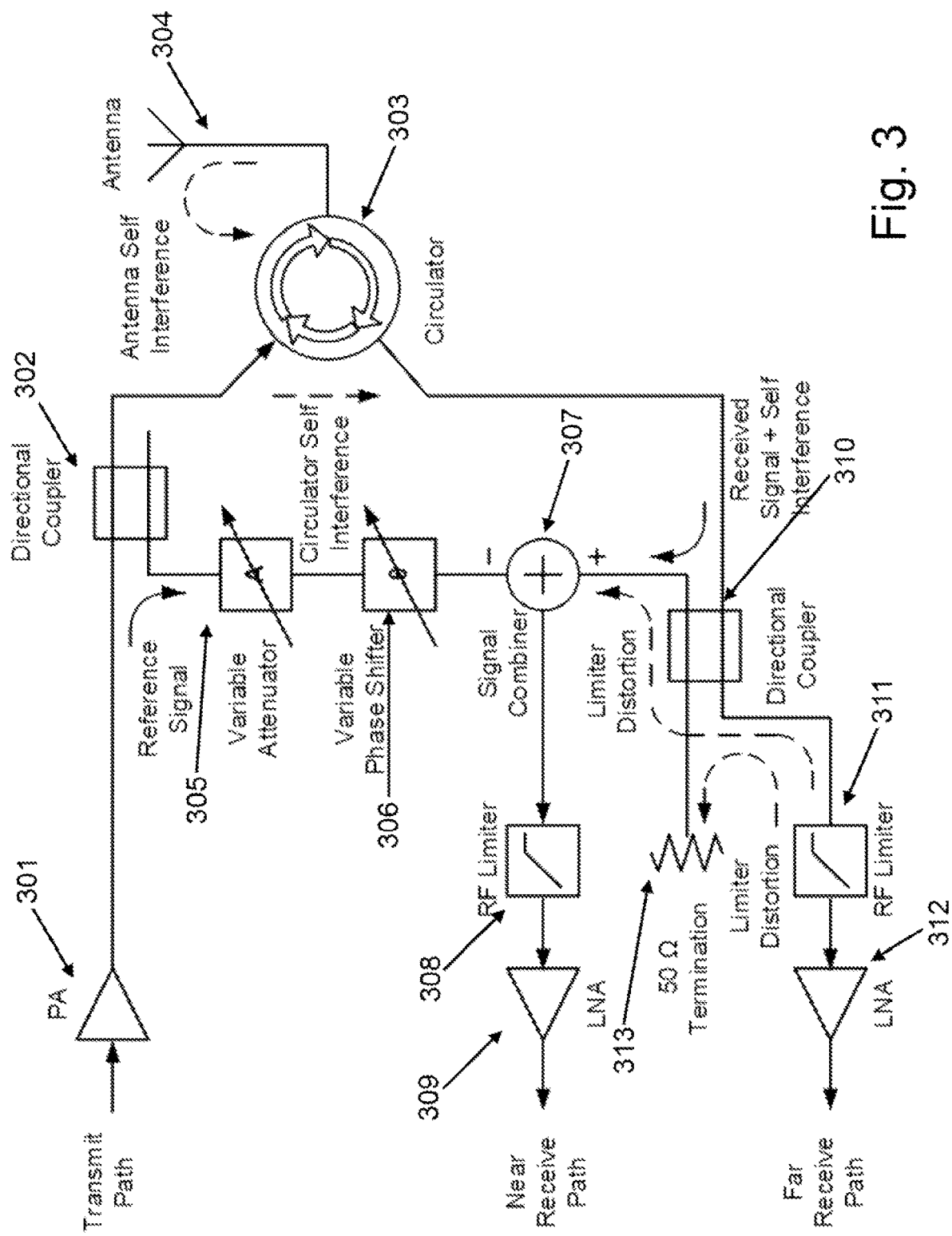
Figure 4A:
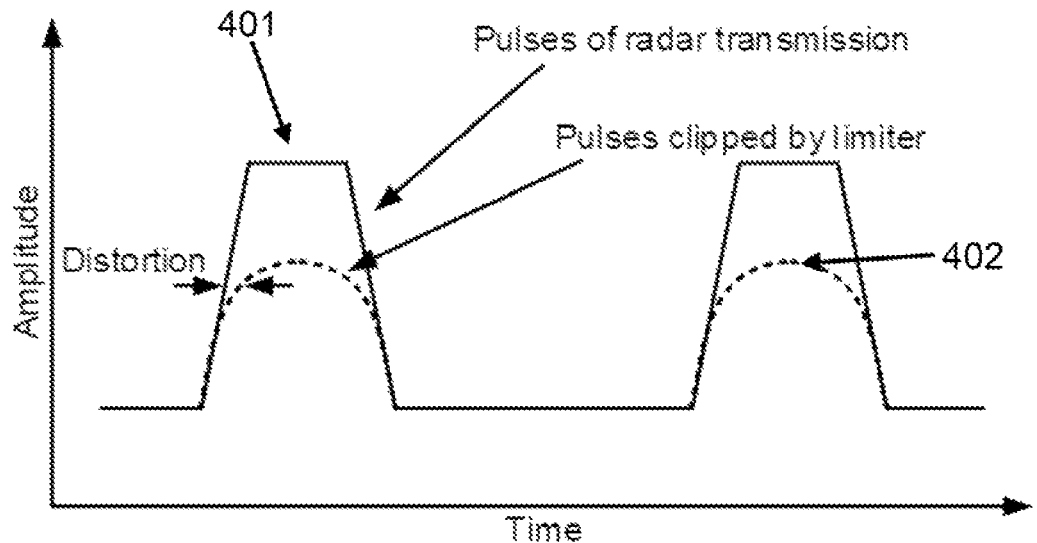
Figure 4B:
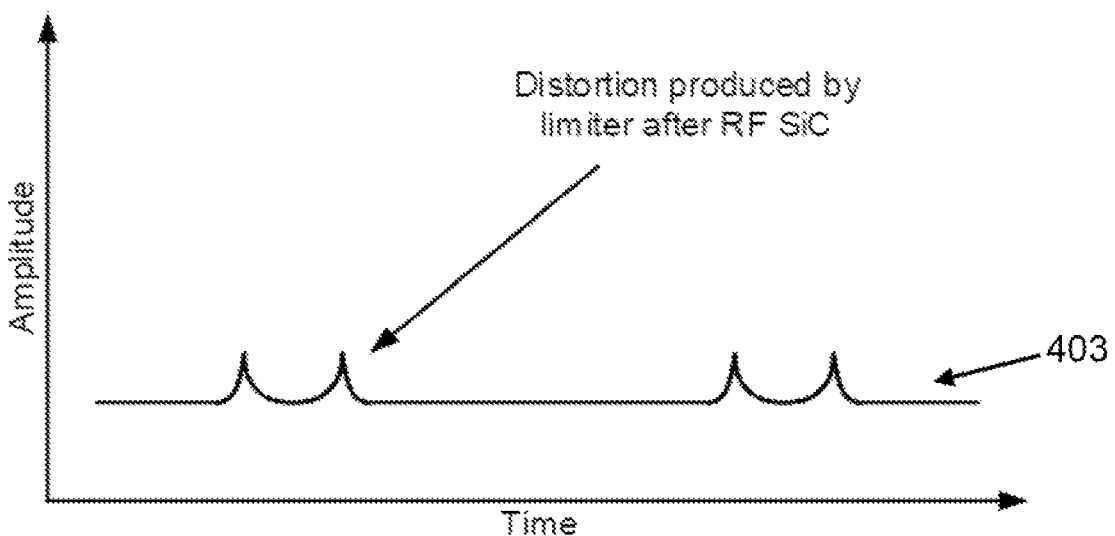
Figure 5:
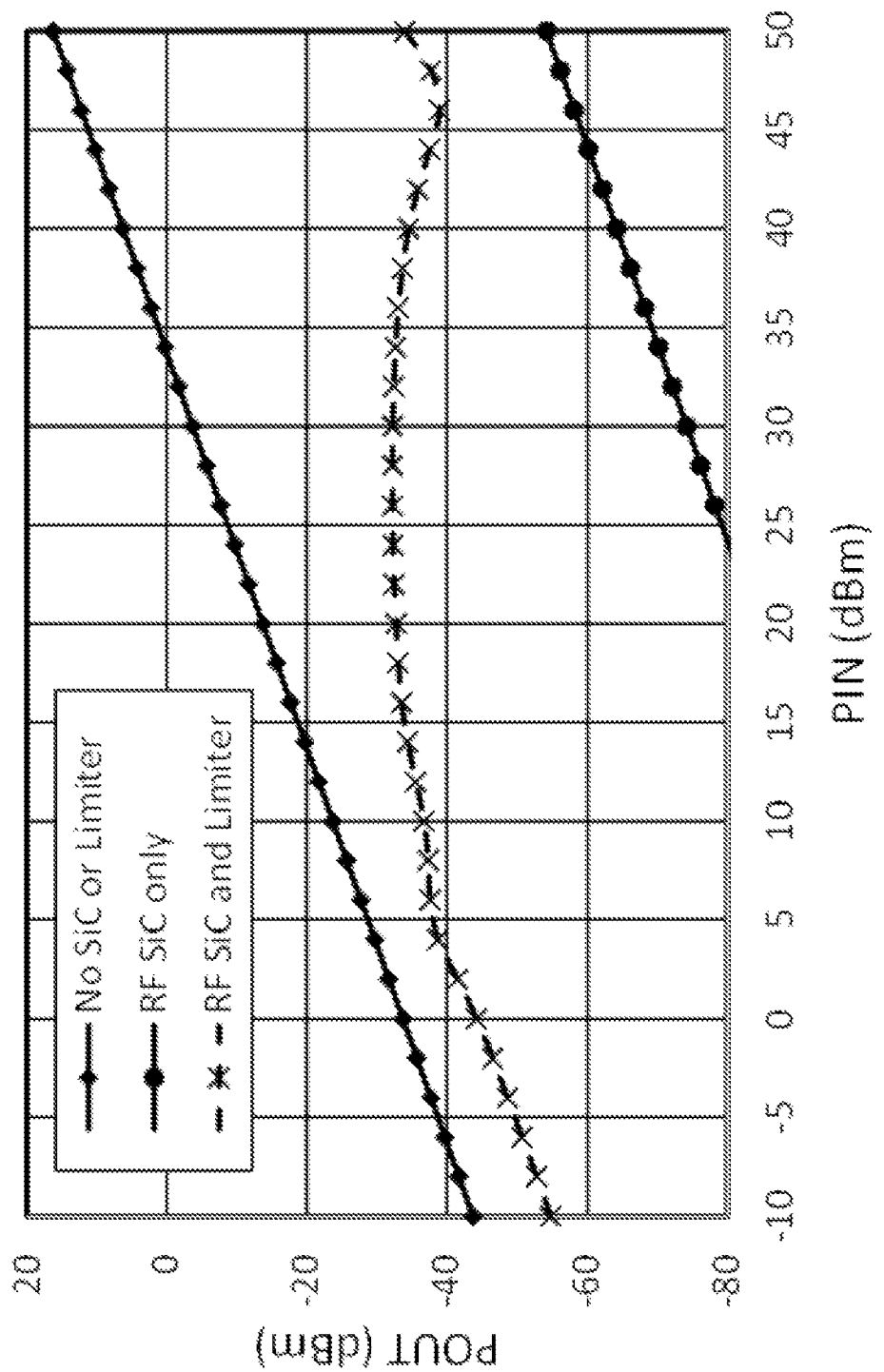
Figure 6:
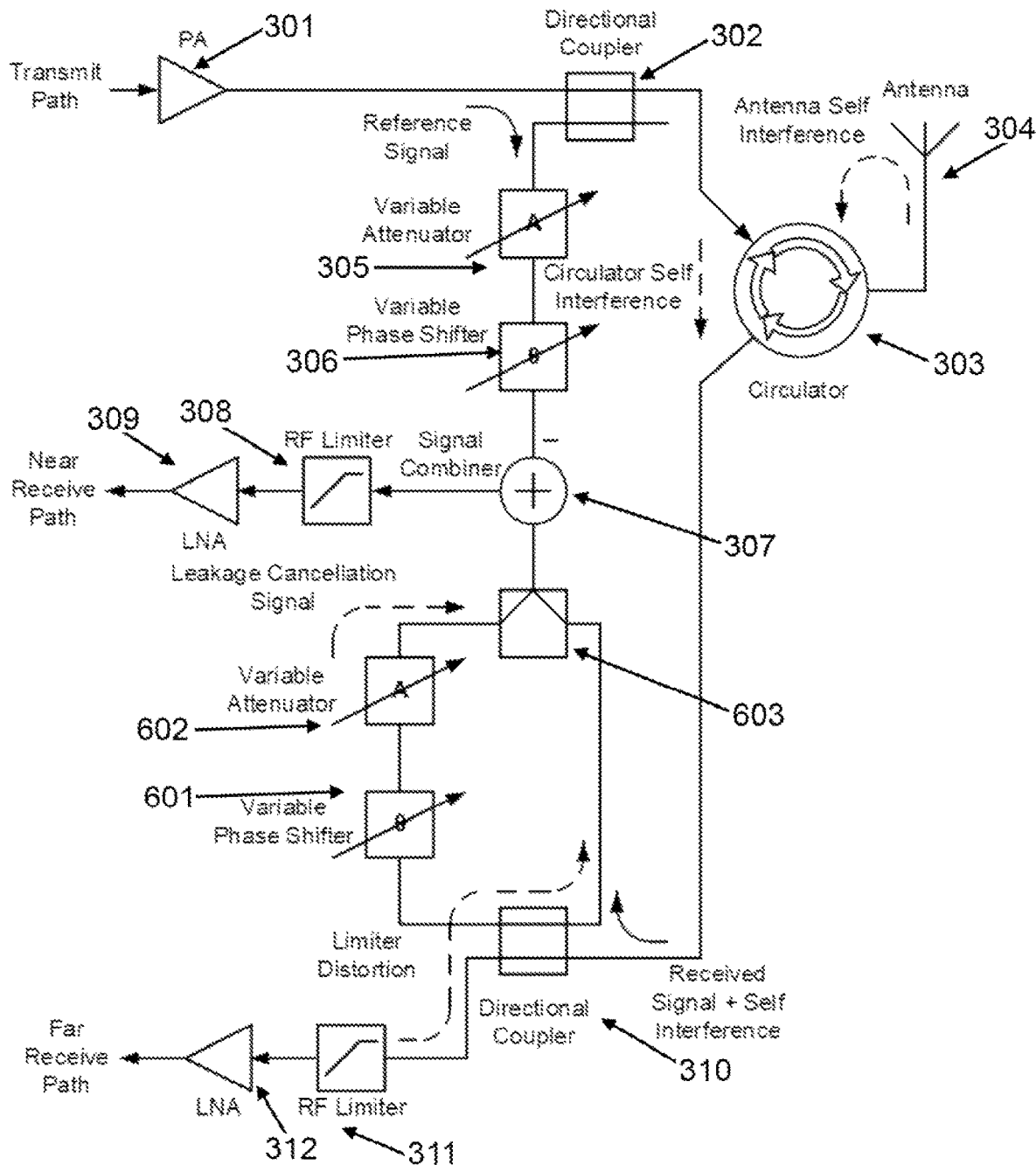
Figure 7:
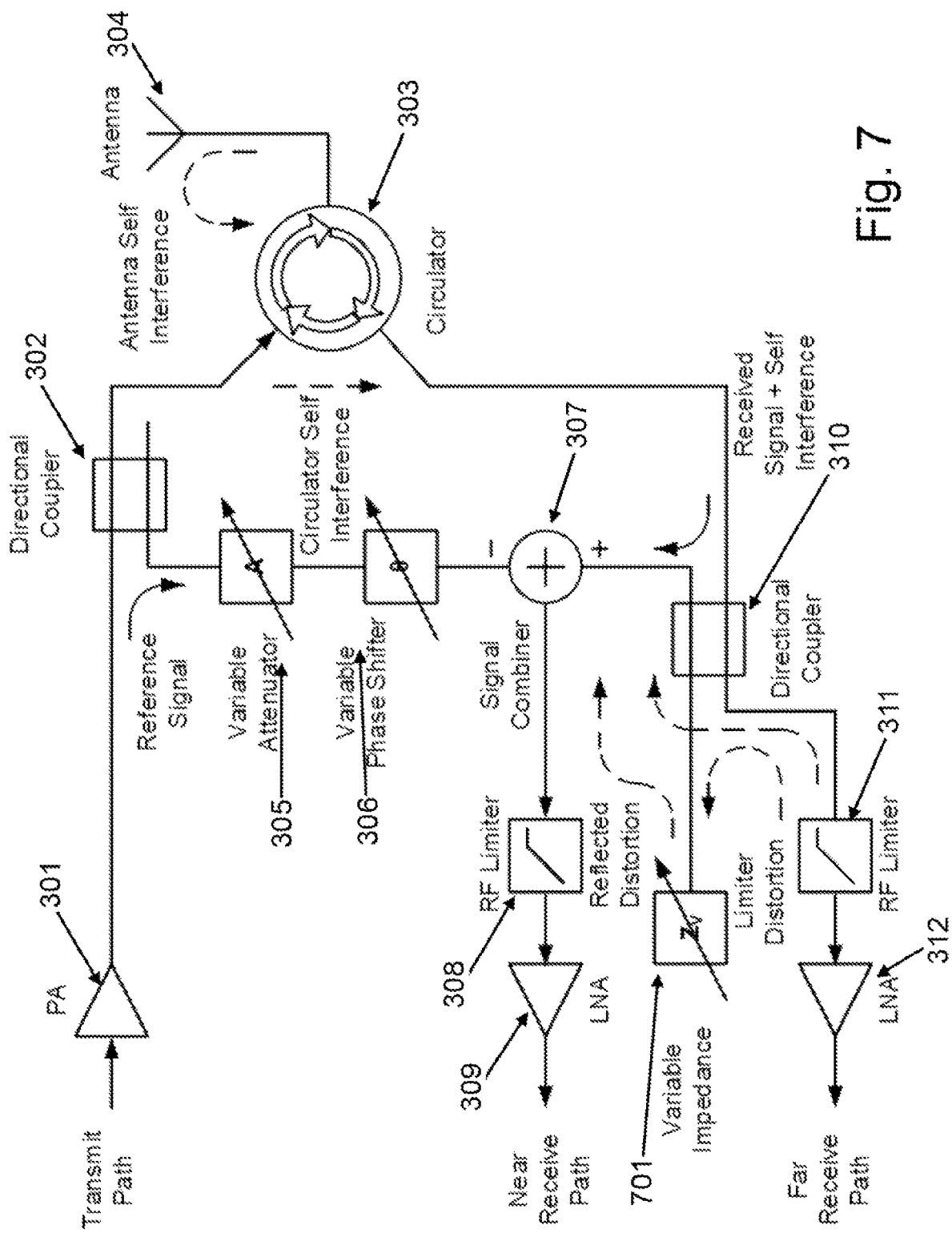
Figure 8A:
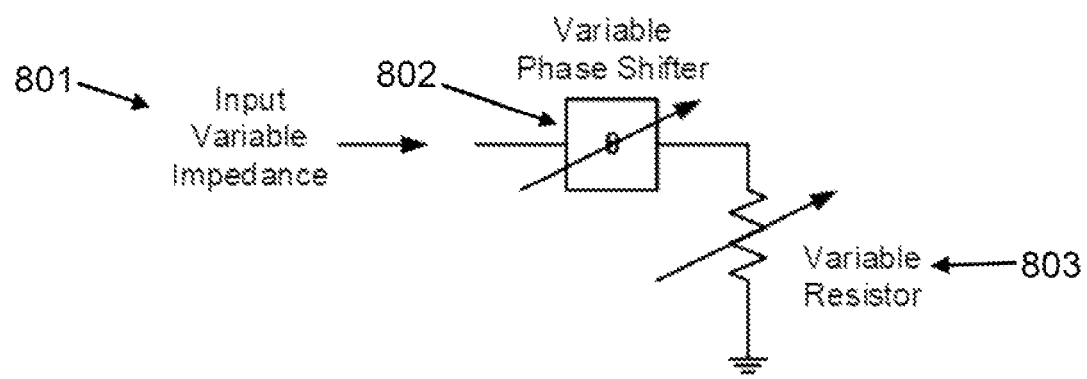
Figure 8B:
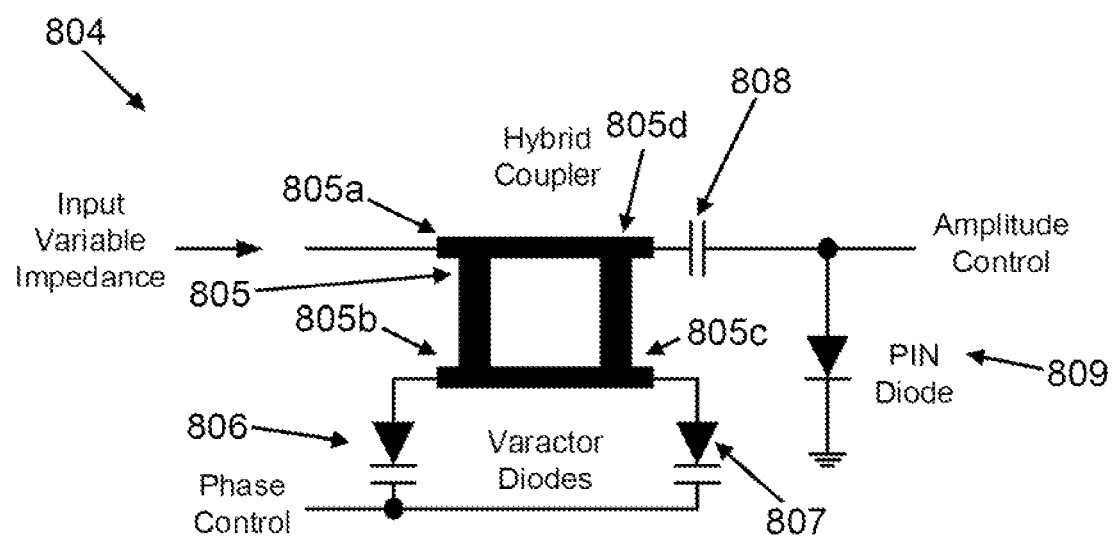
Figure 9:
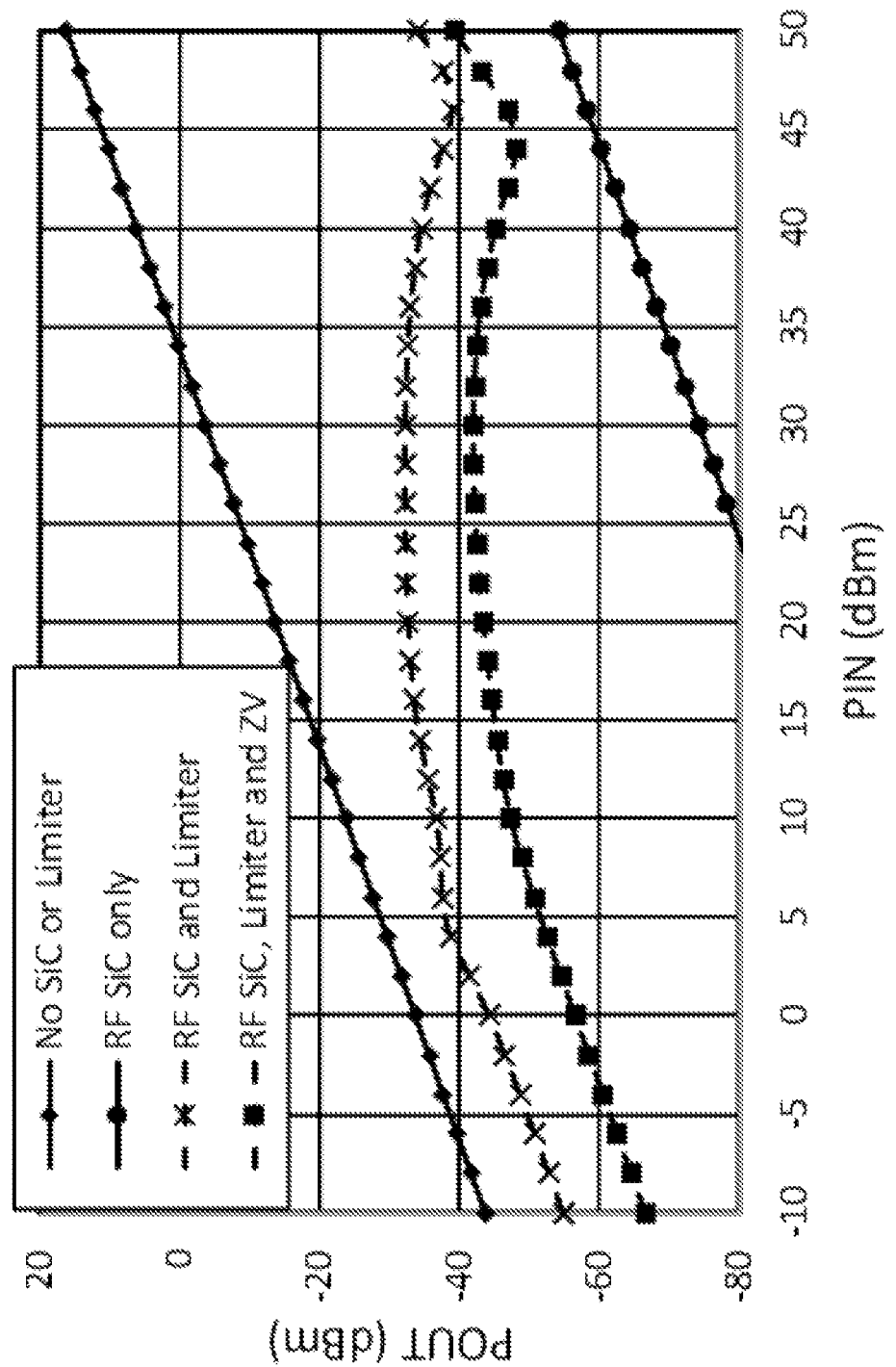
Figure 10A:
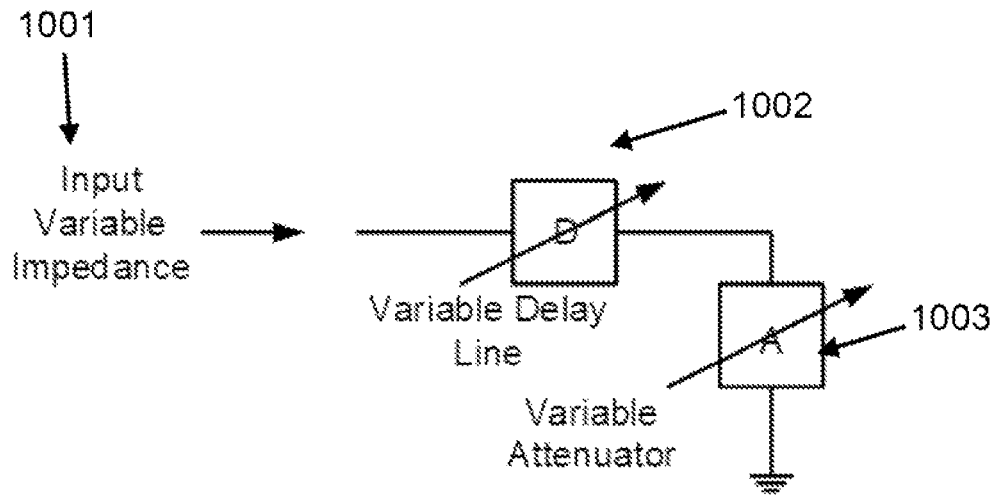
Figure 10B:
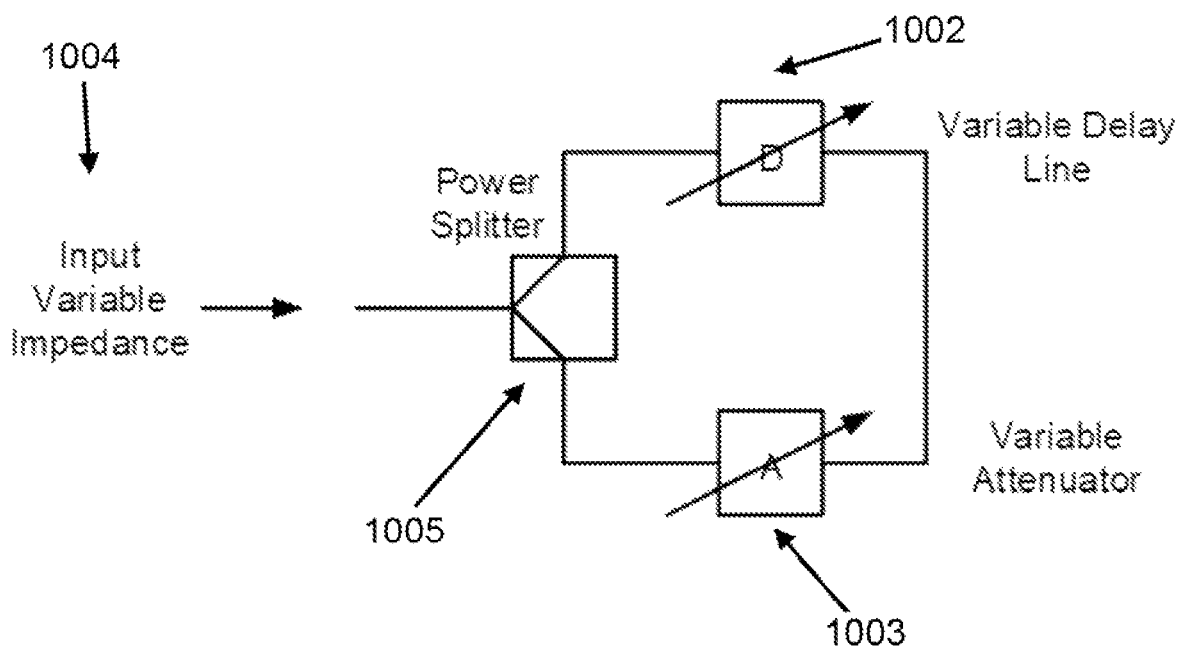

Arrangements of embodiments will be understood and appreciated more fully from the following detailed description, made by way of example only and taken in conjunction with drawings in which:

FIG. 1 shows a radar system;
FIG. 2 shows an example of a radar transmission signal;
FIG. 3 shows a Full Duplex (FD) radar system;
FIG. 4A shows the effect of distortion on radar pulses;
FIG. 4B shows the effect of distortion on the output of the Self-Interference cancellation circuit;
FIG. 5 shows simulated results for a radar system with and without Radio Frequency (RF) self-interference cancellation and/or a limiter;
FIG. 6 shows an approach to reducing the effect of limiter distortion in a Full Duplex (FD) radar system;
FIG. 7 shows a Full Duplex (FD) radar system with limiter distortion suppression using a variable impedance according to an example;
FIG. 8A shows a circuit for generating a variable impedance according to an example;
FIG. 8B shows an implementation of the circuit for generating a variable impedance according to an example;
FIG. 9 shows a performance comparison of the radar system according to an example and other known radar systems;
FIG. 10A shows a circuit for generating a variable impedance according to another example; and
FIG. 10B shows a circuit for generating a variable impedance according to a further example.

DETAILED DESCRIPTION

According to a first aspect there is provided a full duplex radio apparatus comprising: a transmit path configured to transmit a first signal; a receive path configured to receive a received signal; a near-receive path for observing a first period of the received signal; a far-receive path for observing a second period of the received signal, the far-receive path comprising a radio frequency limiter; a self-interference cancellation circuit coupled between the transmit path and the near receive path and configured to cancel at least a portion of a self-interference in the received signal; a variable impedance component; and a directional coupler comprising a first port, a second port, a third port, and a fourth port. Wherein: the first port is coupled to the second port by a first transmission line; the third port is coupled to the fourth port by a second transmission line, and wherein: the first port is coupled to the receive path; the second port is coupled to the radio frequency limiter of the far-receive path; the third port is coupled to the self-interference cancellation circuit; and the fourth port is coupled to the variable impedance component.

In an embodiment the first port is an input port, the second port is a transmitted port, the third port is a coupled port and a fourth port is an isolated port.

In an embodiment coupled comprises electrically connected.

In an embodiment the near-receive path is a receiver chain comprising a Low Noise Amplifier, the near-receive path configured to observe the received signal while the first signal is being transmitted.

In an embodiment the directional coupler is configured such that a portion of a signal inputted on a first port is coupled to the third port; and a majority of the signal inputted on the first port, minus the portion coupled to third port, is outputted on the second port.

In an embodiment the variable impedance component is coupled to ground. In an embodiment the variable impedance component is not coupled to the self-interference cancellation circuit. In an embodiment only the third port of the directional coupler is coupled to the self-interference cancellation circuit.

In an embodiment the variable impedance component comprises at least one of: a variable phase shifter configured to control a phase of the variable impedance component; or a variable resistance configured to control an amplitude of the variable impedance component.

In an embodiment the variable impedance component comprises: a variable phase shifter configured to control a phase of the variable impedance component and a variable resistance configured to control an amplitude of the variable impedance component.

In an embodiment the full duplex radio apparatus further comprises: a controller configured to tune the impedance of the variable impedance component by at least one of: varying a phase shift provided by the variable phase shifter; or varying an amount of attenuation provided by the variable resistor.

In an embodiment the variable impedance component comprises the variable phase shifter and the variable attenuator and wherein: an input of the variable phase shifter is coupled to the fourth port of the directional coupler; an input of the variable resistance is coupled to an output of the variable phase shifter; and an output of the variable resistance is coupled to ground.

In an embodiment the variable impedance component comprises the variable phase shifter and the variable attenuator and wherein: the variable phase shifter comprises: a hybrid coupler comprising a fifth port, a sixth port, a seventh port and an eighth port; a first varactor diode; and a second varactor diode. Wherein: the fifth port of the hybrid coupler is coupled to the fourth port of the directional coupler; the sixth port of the hybrid coupler is coupled to an anode of the first varactor diode; the seventh port of the hybrid coupler is coupled to an anode of the second varactor diode; and a cathode of the first varactor diode and a cathode of the second varactor diode are coupled to a phase control input. And the variable resistance comprises: a capacitor comprising a first terminal and a second terminal, wherein the first terminal is coupled to the eighth port of the hybrid coupler; and a PIN diode, wherein: the anode of the PIN diode is coupled to the second terminal of the capacitor and an amplitude control input; and the cathode of the PIN diode is coupled to ground.

In an embodiment the controller is configured to tune the variable impedance of the variable impedance component by at least one of: adjusting an amplitude of a phase control signal applied to the phase control input; or adjusting an amplitude of a voltage control signal applied to the amplitude control input.

In an embodiment the variable impedance component comprises a variable delay line and a variable attenuator, and wherein: an input of the variable delay line is coupled to the fourth port of the directional coupler; an output of the variable delay line is coupled to an input of the variable attenuator; and an output of the variable attenuator is connected to ground.

In an embodiment the variable impedance comprises: a power splitter comprising: a fifth port, a sixth port and a seventh port; a variable delay line; and a variable attenuator. Wherein: the fifth port of the power splitter is coupled to the fourth port of the directional coupler; the sixth port of the power splitter is coupled to an input of the variable delay line; the seventh port of the power splitter is coupled to an input of the variable attenuator; and an output of the variable delay line is coupled to an output of the variable attenuator.

In an embodiment the power splitter is configured to split a signal inputted on the fifth port into two equal components outputted on the sixth port and the seventh port.

In an embodiment the full duplex radio apparatus further comprises an antenna; wherein: the transmit path is configured to transmit the first signal via the antenna; and the receive path is configured to receive the received signal via the antenna.

In an embodiment the self-interference cancellation circuit comprises: a second directional coupler comprising a fifth port, a sixth port, and a seventh port wherein the fifth port is coupled to the sixth port by a third transmission line; a variable attenuator; a variable phase-shifter; and a signal combiner comprising a first input, a second input, and a first output. Wherein: the fifth port of the second directional coupler is coupled to the transmit path; the sixth port of the second directional coupler is coupled to the antenna; the seventh port of the second directional coupler is coupled to an input of the variable attenuator; an output of the variable attenuator is coupled to an input of the variable phase shifter; an output of the variable phase shifter is coupled to the first input of the signal combiner; the third port of the directional coupler is coupled to the second input of the signal combiner; and the first output of the signal combiner is coupled to the near receive path.

In an embodiment the signal combiner is configured to subtract the signal on the second input from the signal on the first input and output the result on the first output.

In an embodiment the fifth port is an input port of the second directional coupler, the sixth port is a transmitted port of the second directional coupler and the seventh port is a coupled port of the second directional coupler.

In an embodiment the full duplex radio apparatus further comprises a circulator, the circulator comprising an eighth port, a ninth port and a tenth port. Wherein: the eighth port of the circulator is coupled to the sixth port of the second directional coupler; the ninth port of the circulator is coupled to the antenna; and the tenth port of the circulator is coupled to the first port of the directional coupler.

In an embodiment the circulator is configured to output a signal on a port directly after the port on which the signal was inputted, and wherein the ninth port is directly after the eighth port, the tenth port is directly after the ninth port and the eighth port is directly after the ninth port.

In an embodiment the transmit path comprises a power amplifier; the near receive path comprises a second limiter and a first Low Noise Amplifier; and the far receive path further comprises a second Low Noise Amplifier.

In an embodiment the near-receive path is used for Full Duplex operation.

Also disclosed is a radar comprising the full duplex radio apparatus according to claim 1.

Also disclosed is a weather radar comprising the full duplex radio apparatus according to claim 1.

FIG. 1 shows a radar system. The radar system of FIG. 1 comprises a power amplifier 101 connected to the transmit path of the radar system. The power amplifier is electrically coupled to a circulator 102. The circulator 102 is coupled to an antenna 103. As known in the art, a circulator is a passive device that is used to control the direction of signal flow in an electronic circuit. It is common in radar systems for there to be a single antenna for reception and transmission. Consequently, the circulator 102 is used in FIG. 1 to provide isolation between the transmit path and the receive path. The circulator 102 is also coupled to a Radio Frequency (RF) limiter 104. The Radio Frequency (RF) limiter 104 is coupled to a Low Noise Amplifier (LNA) 105, the output of which is connected to the receive path of the radar system.

In the system of FIG. 1 the Radio Frequency (RF) limiter 104 is provided to protect the Low Noise Amplifier (LNA) from the power generated during transmission, which can equal 100 Watts. The circulator 102 typically provides approximately 20 decibels (dB) of isolation between the port connected to the transmit path and the port connected to the receive path. In this case a power of 1 Watt leaks through the circulator 102 to the input of the Low Noise Amplifier (LNA) 105. Furthermore, there can often be a mismatch between the antenna and the transmit path that reflects back part of the transmitted signal. The power of this reflected signal can be of a similar level to the leakage power of the circulator 102 (i.e. 1 Watt).

FIG. 2 shows an example of a radar transmission signal. Radar systems transmit short pulses. FIG. 2 shows a radar transmission signal 201 comprising a first pulse 202 and a second pulse 203. It will be appreciated that FIG. 2 is not to scale and is for illustrative purposes only. The pulse width (i.e. the elapsed time between a rising edge and a falling edge of a pulse of energy) is typically of the order of 40 µs. Given the typical transmission frequencies of radar signals, this pulse width is equivalent to a range during which reception is not possible for the first 6 kilometers. Consequently, without sufficient self-interference cancellation it would not be possible to observe objects closer than 6 kilometers because the self-interference from the transmission signal would overpower any reflections from the objections.

The pulse period (i.e. the time between a rising edge of the first pulse 202 and a rising edge of the second pulse 203) is typically 400 µs, to allow detection up to 60 kilometers. The pulses of the transmission signal 201 have defined rise and fall times. These are shown in FIG. 2 as linear slopes. Shaping the transmit signal to have a gradual transition ensures the transmitted signal is kept within a spectral emission mask and complies with regulations.

If reception below 6 kilometers is required, there are three options.

A first option is to transmit a second shorter pulse on a different frequency. However this approach requires double the frequency resources.

A second option is to transmit two alternative pulses. A first pulse of a short pulse width for detecting near objects and a second pulse of a longer pulse width to detect far objects. However this approach adds complexity and doubles the imaging time (or halves the imaging rate).

A third approach is to exploit Full Duplex (FD) techniques. In this case one long pulse can be used for the reception of signals (e.g. reflections) from both near and far objects because the Full Duplex (FD) techniques allow near field signals to be observed during the transmit phase of the radar.

FIG. 3 shows a Full Duplex (FD) radar system. FIG. 3 shows a Full Duplex (FD) radar system that uses a single frequency channel and comprises two receive paths: a near receive path and a far receive path.

In detail, FIG. 3 shows a power amplifier 301 electrically coupled to a transmit path of the radar system. The power amplifier is also electrically coupled to a first directional coupler 302.

As known in the art, a directional coupler is a passive electronic device that couples a defined amount of power from a transmission line that extends through the directional coupler, to another port of the directional coupler. This enables a proportion of the signal that is present on the transmission line through the directional coupler to be used in another part of the circuit.

Directional couplers generally have four ports. An input port (port 1), where power is applied. A transmitted port (port 2) where power from the input port is outputted. A coupled port (port 3) where a portion of the power applied to the input port (port 1) appears and an isolated port (port 4). The coupled port (port 3) can also be referred to as the forward coupled port and the isolated port (port 4) can also be referred to as the reverse coupled port. The amount of power outputted from the transmitted port (port 2) is equal to the amount of power inputted on the input port (port 1) minus the power coupled to the coupled port (port 3).

A portion of the power applied to the transmitted port (port 2) will be coupled to the isolated port (port 4), thereby providing coupling in the reverse direction (hence, "the reverse coupled port"). However the device is not normally used in this mode and the isolated port (port 4) is normally terminated with a matched load (typically 50 Ohms).

In an ideal directional coupler, when power is input on the input port (port 1), a first portion is coupled to the transmitted port (port 2) and a second portion is coupled to the coupled port (port 3), but no power is coupled to the isolated port (port 4). Likewise, when power is applied to the transmitted port (port 2), power is outputted on the input port (port 1) and the isolated port (port 4) but no power is coupled to the coupled port (port 3). In practice there is often back power (i.e. power outputted from the isolated port (port 4) when power is inputted on the input port (port 1), and/or power outputted from the coupled port (port 3) when power is inputted on the transmitted port (port 2)). The amount of back power or unintended coupling is related to the directivity of the directional coupler.

In one example, a directional coupler is implemented using two transmission lines. A first transmission line couples the input port (port 1) to the transmitted port (port 2), and a second transmission line couples the coupled port (port 3) and the isolated port (port 4). The first transmission line and the second transmission line are located sufficiently close to each other (i.e. within close proximity of each other) such that the energy and fields from one transmission line interact with the other transmission line.

In FIG. 3 the coupled port (port 3) is connected to a self-interference cancellation circuit, which is discussed in more detail below. The transmitted port (port 2) of the first directional coupler 302 is electrically coupled to a first terminal of a circulator 303. A second terminal of the circulator 303 is connected to an antenna 304.

The Self-Interference Cancellation (SiC) circuit comprises a variable attenuator 305 connected to the coupled port (port 3) of the first directional coupler 302. The output of the coupled port (port 3) is a reference signal that is a coupled version of the transmit signal. The variable attenuator is configured to attenuate the reference signal. The output of the variable attenuator 305 is electrically coupled to a variable phase shifter 306. The variable phase shifter 306 is configured to vary the phase of the attenuated reference signal. The output of the variable phase shifter 306 is coupled to a signal combiner 307. The variable attenuator 305 and the variable phase shifter 306 are configured to manipulate the gain and phase of the reference signal such that the self-interference of the system is cancelled when the modified reference signal is subtracted, by the signal combiner 307, from a received signal that comprises a desired signal component and a self-interference component.

The output of the signal combiner 307 is connected to a first Radio Frequency (RF) Limiter 308. As known in the art, a limiter is an electronic component that limits the power to downstream components in order to prevent overload and damage. The output of the first Radio Frequency (RF) Limiter 308 is connected to a first Low Noise Amplifier 309. The Low Noise Amplifier 309 is configured to amplify the signal outputted from the first Radio Frequency (RF) Limiter 307. This signal corresponding to the received signal, adjust to (at least partly) cancel the Self-Interference (SI) of the system. The first Radio Frequency (RF) Limiter 308 and the first Low Noise Amplifier 309 form the near receive path in the system of FIG. 3.

In the system of FIG. 3 reception occurs on the near receive path only during the time when the transmit path is transmitting a pulse. As discussed above, this period is optionally 40 μs. After the pulse has been transmitted reception occurs on the far receive path only. Since it is only the near receive path that receives a signal during the transmission of the transmit pulse, a Full Duplex (FD) system (e.g. including self-interference cancellation filter) is only needed for the near receive path.

The circulator 303 also comprises a third terminal. The third terminal conveys a signal received via the antenna 304 to the near and far receive path circuitry. The output from the third terminal of the circulator 303 is referred to herein as the received signal. As discussed above the received signal comprises a desired signal component. In a radar the desired signal component represents a signal generated by an object (e.g. due to a reflection). The received signal also comprises a Self-Interference (SI) component. The Self-Interference (SI) component is formed from antenna Self-Interference and circulator Self-Interference.

The third terminal of the circulator 303 is coupled to a second directional coupler 310. The second directional coupler 310 has similar functionality to the first directional coupler 302 discussed above in that it taps off a portion of a signal. In FIG. 3 the input port (port 1) of the second directional coupler 310 is coupled to the circulator 303, a transmitted port (port 2) of the second directional coupler 310 is coupled to a second Radio Frequency Limiter (RF) 311, and a coupled port (port 3) of the second directional coupler 310 is coupled to the signal combiner 307. Consequently, a proportion of the received signal is coupled, by the second directional coupler 310 to the self-interference cancellation circuit, specifically the signal combiner 307. A proportion of the received signal is also outputted at the transmitted port (port 2) of the second directional coupler 310 for processing by the far receive path. In FIG. 3 the isolated port (port 4) of the section directional coupler 310 is coupled to a 500 (Ohm) termination 313.

The second Radio Frequency (RF) limiter 311 is connected to a second Low Noise Amplifier 312. The second Radio Frequency (RF) limiter 311 and the second Low Noise Amplifier 312 form the far receive path.

During the transmit pulse both the near receive path and the far receive path are subjected to a large leakage signal due to the leakage of the circulator 303. Furthermore, as mentioned above, the reflection from the antenna 304 mismatch can be significant. In the near receive path the amplitude of the signal is reduced by the second directional coupler 310 because only a proportion (i.e. not a majority) of the leakage signal is coupled to the signal combiner 307. However, the leakage signal arrives at almost full power to the far receive path (comprising the second RF Limiter 311 and the second Low Noise Amplifier 312). Without the second RF Limiter 311, the second Low Noise Amplifier 312 of the far receive path could become damaged.

It is possible that the second RF limiter 311 uses semiconductor diodes which clip the input waveform, which in this case corresponds to the leaked component of the transmitted pulse. The clipping from the second RF limiter 311 introduces distortion into the waveform.

FIG. 4A shows the effect of distortion on radar pulses. FIG. 4 shows the shape of a radar pulse without distortion 401, and the shape of a radar pulse clipped by the limiter 402.

Referring back to FIG. 3, some of the clipped signal will be reflected back from the RF limiter 311 towards the directional coupler 310 due to impedance mismatches. This signal will be coupled by the second directional coupler 310 to the isolated port (port 4). Since the directional coupler is not ideal in practice there will also be some power coupled to the coupled port (port 3) of the second directional coupler 310, resulting in distortion appealing in the near receive path as shown in FIG. 3.

In the absence of any limiter distortion, leakage in the transmit signal (e.g. due to the circulator 303) would be coupled to the near receive path (specifically the signal combiner 307) via the second directional coupler 310. A replica of the transmit signal (referred to as the reference signal) is also be coupled to the near receive path via the first directional coupler 302. Once the phase and gain of the reference signal is varied by the variable attenuator 305 and the variable phase shifter 306, the modified reference signal is inputted to the signal combiner 307. If the attenuation and the phase shifts are determined appropriately, the coupled, attenuated, shifted version of the transmit signal cancels the leakage signal, thereby cancelling the self-interference.

However, since the limiter distortion is unique to the receive path (i.e. its source is not on the transmit path), it cannot be cancelled by a coupled, attenuated, phase-shifted version of the transmit signal like the self-interference.

FIG. 4B shows the effect of distortion on the output of the Self-Interference cancellation circuit. In particular FIG. 4B shows a waveform comprising distortion produced by the second RF limiter at the output of the RF Self-Interference Cancellation circuit.

FIG. 5 shows simulated results for a radar system with and without Radio Frequency (RF) self-interference cancellation (SiC) and/or a limiter. In particular FIG. 5 shows how an output power of a system varies with input power. In this context the input power ($P_{IN}$) represents the power of the transmit pulse and the output power ($P_{OUT}$) represents the power of the signal applied to the Low Noise Amplifier (LNA) of the near receive path.

In the simulation shown in FIG. 5 the input power (i.e. the power of the transmit pulse increases linearly from −10 to 50 dBm (i.e. from 10 Milliwatts (mW) to 100 Watts (W)). This power variation is typical of the variations that occur during a rise time of the transmit pulse.

FIG. 5 shows that without a limiter or Self-interference Cancellation (SiC) the maximum power applied to the Low Noise Amplifier (LNA) of the near receive path is 16 dBm. When (only) Radio Frequency (RF) Self-interference Cancellation (SiC) is used (i.e. without a limiter on the far receive path), the maximum power applied to the Low Noise Amplifier (LNA) of the near receive path is −54 dBm. In this case 70 dB of Self-interference cancellation is provided.

When both a limiter on the far receive path and Self-interference Cancellation (SiC) circuitry is used the maximum power applied to the Low Noise Amplifier (LNA) of the near receive path is −34 dBm. In this case a maximum of 50 dB of Self-interference cancellation is provided. In the simulation of FIG. 5, the variable attenuator and the variable phase shifter of the Self-interference Cancellation (SiC) circuit were optimized to restrict the maximum output power applied to the Low Noise Amplifier (LNA) of the near receive path to −34 dBm over the widest range of input powers. Furthermore, with this arrangement it is also possible to tune a deep sharp null at a particular input power.

From FIG. 5 it would appear that the approach that minimizes input power on the near receive path is to only use Radio-Frequency (RF) self-interference cancellation. However, this approach is not practical. Not least because a limiter is required on the far receive path to protect the Low Noise Amplifier of the far receive path from the high power leakage signals. Consequently, there is a need to reduce the amount of limiter distortion introduced by the presence of the limiter so that the maximum output power applied to the Low Noise Amplifier (LNA) of the near receive path is reduced, closer to what is achieved with Self-interference Cancellation alone.

FIG. 6 shows an approach to reducing the effect of limiter distortion in a Full Duplex (FD) radar system. In FIG. 6 same reference numerals as those used in FIG. 3 denote similar components. In addition to those components shown in FIG. 3, the system shown in FIG. 6 also comprises a second variable phase shifter 601 coupled to the fourth port of the second directional coupler 310 and a second variable attenuator 602 coupled to an output of the second variable phase shifter 601.

The output of the variable attenuator 602 is coupled to a second port of a power splitter 603, a third port of the power splitter 603 is coupled to the third port of the directional coupler 310 and a first port of the power splitter 603 is coupled to an input of the signal combiner. As known in the art, a power splitter 603 is a passive electronic device that is configured to split the signal present on the first port into two components and output the two components on the second and third ports respectively. The power splitter 603 can also be used as a power combiner. In this configuration the power splitter 603 combines the signals inputted on the second port and the third port. The combined signal is outputted on the first port of the power splitter 603.

In FIG. 6 an error signal is generated from the isolated port (port 4) of the second directional coupler 310. The output of the isolated port (port 4) is phase shifted and attenuated to generate a leakage cancellation signal. The leakage cancellation signal compensates for the limiter distortion generated by the second RF limiter 311.

Although the approach shown in FIG. 6 reduces the effect of limiter distortion the additional components incur additional losses and an increased board size will be required due to the requirement for the power splitter 603.

Another way to reduce the amount on limiter distortion that is present in the near receive path is to increase the directivity of the coupler thereby reducing the amount of coupling between the transmitted port (port 2) of the second directional coupler 310 and the coupled port (port 3) of the second directional coupler 310, which is subsequently fed to the signal combiner 307. This can be achieved by using an additional substrate above the Printed Circuit Board of the directional coupler in order to increase directivity. However, this approach is not tunable. Consequently, this approach is not suitable for systems where very high cancellation is required like Full Duplex (FD) systems. Furthermore, this approach requires an extra piece of material to be mechanically attached to the top of the Printed Circuit Board.

FIG. 7 shows a Full Duplex (FD) radar system with limiter distortion suppression using a variable impedance according to an example. In FIG. 7 same reference numerals as those used in FIG. 3 denote similar components. In addition to those components shown in FIG. 3, the system shown in FIG. 7 also comprises a variable impedance 701 coupled to the isolated port (port 4) of the second directional coupler 310. The variable impedance 701 replaces the 500 (Ohm) termination connected to the isolated port (port 4) in FIG. 3 and increases the directivity of the second directional coupler 310, thereby reducing the amount of limiter distortion in the near receive path. This approach to reducing limiter distortion is advantageous because it requires minimum modification to existing hardware.

FIG. 8A shows a first circuit for generating a variable impedance according to an example. The first variable impedance circuit 801 comprises a variable phase shifter 802 and a variable resistor 803. The variable resistor 803 controls the magnitude of the variable impedance and the variable phase shifter 802 controls the phase of the variable impedance.

FIG. 8B shows an implementation of the circuit for generating a variable impedance according to an example. In FIG. 8B a variable impedance circuit 804 is realized using a hybrid coupler 805. An input of the variable impedance circuit 804 is coupled to a first port of the hybrid coupler.

A known type of hybrid coupler is a quadrature hybrid coupler. As known in the art a quadrature hybrid coupler comprises four transmission line sections, each of which are a quarter of a wavelength long. Two of the transmission lines in the quadrature hybrid coupler have an impedance equal to the characteristic impedance of the system ($Z_0$), while the other two transmission lines have an impedance equal to the characteristic impedance divided by the square root of 2 ($Z_0/\sqrt{2}$). Optionally the characteristic impedance of the system is 50Ω.

The quadrature hybrid coupler is a four-port device comprising a first port 805a, a second port 805b, a third port 805c, and a fourth port 805d. A first transmission line between the first port 805a and the second port 805b, and a second transmission line between the third port 805c and the fourth port 805d have an impedance equal to the characteristic impedance divided by the square root of 2 (i.e. $Z_0/\sqrt{2}$). A third transmission line between the first port 805a and the fourth port 805d, and a fourth transmission line between the second port 805b and the third port 805c have an impedance equal to the characteristic impedance of the system (i.e. $Z_0$).

In the implementation of FIG. 8B, the second port and the third port of the hybrid coupler 805 are terminated by reactive loads in the form of a first varactor diode 806 and a second varactor diode 807 respectively. As known in the art, a varactor diode is a diode whose capacitance varies with variations in the reverse bias voltage. The anode of the first varactor diode 806 is coupled to the second port of the hybrid coupler 805. The cathode of the first varactor diode 806 is coupled to a phase control line on which a positive voltage is applied. The anode of the second varactor diode 807 is coupled to the second port of the hybrid coupler 805. The cathode of the second varactor diode 807 is coupled to the phase control line.

In FIG. 8B the magnitude of the signal applied to the phase control line controls the load at the second and third ports of the hybrid coupler 805. The reactance presented by the first and second varactor diodes will cause reflections which, when combined, will cause an output on a fourth port 805d of the hybrid coupler 805 that is a phase shifted version of the signal inputted to the first port 805a of the hybrid coupler 805. Consequently a phase shifted version of the input signal can be obtained by controlling the phase control line.

The fourth port 805d of the hybrid coupler 805 is coupled to a DC blocking capacitor 808. The capacitor 808 is also coupled to an anode of a diode 809, optionally a PIN diode. The cathode of the diode 808 is coupled to ground.

An amplitude control line is also coupled to the capacitor 808 and the anode of the diode 809. The signal applied to the amplitude control line controls the magnitude of the input impedance.

In one example, amplitude and phase control lines are connected to a controller (not shown). The controller is configured to tune the variable phase shifter and the variable resistor. The variable impedance shown in FIG. 8A and FIG. 8B provides a different response at different frequencies. Consequently, the properties of the variable impedance are tuned, by the controller, so that a reduction in limiter distortion is achieved at the operating frequency of the system.

Tuning the variable impedance can take different forms. In one example the level of self-interference at the output of the first Low Noise Amplifier 309 on the near receive path is observed and the amplitude and phase of the variable impedance 702 is adjusted to minimize the amount of self-interference. Optionally the amount of self-interference on the near receive path is observed in the analogue domain using a power detector (e.g. comprising a diode and a filter). Alternatively the amount of self-interference on the near receive path is observed in the digital domain.

Optionally, the controller comprises an input/output module, a processor and a non-volatile memory. The input/output module is coupled to the phase control line and the amplitude control line. The processor is coupled to the input/output module and to the non-volatile memory. The non-volatile memory stores computer program instructions that, when executed, cause the processor to tune the variable impedance component and to cause the input/output module to output a signal to the phase control line and the amplitude control line that configures the variable impedance component as determined during tuning. In particular, the non-volatile memory stores computer program instructions that, when executed, cause the processor to observe the amount of self-interference on the output of the near receive path (e.g. using analogue means or digital means as discussed above) and execute a first algorithm that optimizes the amplitude and phase of the variable impedance 702 to reduce the self-interference power at the output of the near receive path.

The use of a variable impedance as described in relation to FIG. 7, FIG. 8A and FIG. 8B has the advantage that it is physically smaller than other approaches and so takes up less board space. Furthermore, the simple structure of the implementations incur less losses and enable the circuit to be tuned over a wide region of input powers.

FIG. 9 shows a performance comparison of the radar system according to an example and other known radar systems. In particular FIG. 9 shows that the techniques described herein of using a variable impedance to terminate the isolated port (port 4) of a directional coupler increase the amount of Self-Interference Cancellation (SiC) by 10 decibels (dB), which reduces the absolute power at the near receive path by 10 dB, thereby preventing overloading of the first Low Noise Amplifier 309 and potentially damaging it. FIG. 9 shows that the variable impedance termination technique disclosed herein improves the amount of self-interference cancellation and reduces the effect of limiter distortion compared to other techniques, while still protecting the Low Noise Amplifier (LNA) of the far receive path from the high power leakage signals.

FIG. 10A shows a circuit for generating a variable impedance according to another example. The second variable impedance circuit 1001 comprises a variable delay line 1002 connected to an input of the circuit. The variable delay line is configured to vary the propagation delay for a signal to propagate between an input of the variable delay line 1002 and an output of the variable delay line 1002. The output of the delay line is coupled to an input of a variable attenuator 1003. The variable attenuator is configured to vary the amplitude of the signal outputted by the variable delay line 1002. An output of the variable attenuator 1003 is coupled to ground.

FIG. 10B shows a circuit for generating a variable impedance according to a further example. The third variable impedance circuit 1004 comprises a power splitter 1005. A first port of the power splitter 1005 is coupled to an input of the third variable impedance circuit 1004. A second port of the power splitter 1005 is coupled to an input of a variable delay line 1002. A third port of the power splitter 1005 is coupled to an input of a variable attenuator 1003. The output of the variable attenuator 1003 is coupled to an output of the variable delay line 1002.

There are many use-cases for the above described techniques for reducing limiter distortion. For example, Full Duplex (FD) is a natural fit for weather radar as it greatly enhances the operating range. The variable impedance described above can be incorporated into a Full Duplex weather radar to increase its performance.

Furthermore, limiters are used in many communications systems where Full Duplex could be applied. For example, the limiter distortion technique described above could be used in other field outside of radar like mmWave backhaul.

The term coupled used herein means electrically coupled (i.e. connected in a way that permits an electrical current to flow).

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A full duplex radio apparatus comprising:
   a transmit path configured to transmit a transmit signal including a first pulse having a pulse width less than a predetermined time and a second pulse having a pulse period more than the predetermined time, the transmit path being coupled to an antenna;
   a receive path configured to receive a received signal, the receive path being coupled to the antenna;
   a first receive path for observing the first pulse from the received signal, the first receive path branching from the receive path;
   a second receive path for observing the second pulse from the received signal, the second receive path comprising a radio frequency limiter, the second receive path branching from the receive path, and the receive path being divided into the first receive path and the second receive path;
a variable impedance component;
a first directional coupler comprising a first port, a second port, a third port, and a fourth port;
a second directional coupler comprising a fifth port, a sixth port, and a seventh port; and
a self-interference cancellation circuit configured to input a signal from the receive path via the first directional coupler and a signal from the transmit path via the second directional coupler, cancel at least a portion of a self-interference in the received signal, and output the canceled signal to the first receive path, wherein:
the first port is coupled to the second port;
the third port is coupled to the fourth port;
the first port is coupled to the receive path;
the second port is coupled to the radio frequency limiter of the second receive path;
the third port is coupled to the self-interference cancellation circuit;
the fourth port is coupled to the variable impedance component;
the fifth port is coupled to the sixth port;
the fifth port is coupled to the transmit path;
the sixth port is coupled to the antenna; and
the seventh port is coupled to the self-interference cancellation circuit.

2. The full duplex radio apparatus according to claim 1, wherein the variable impedance component comprises at least one of:
a variable phase shifter configured to control a phase of the variable impedance component; or
a variable resistance configured to control an amplitude of the variable impedance component.

3. The full duplex radio apparatus according to claim 2, further comprising:
a controller configured to tune the variable impedance of the variable impedance component by at least one of:
varying a phase shift provided by the variable phase shifter; or
varying an amount of attenuation provided by the variable resistance.

4. The full duplex radio apparatus according to claim 3, wherein:
the variable impedance component comprises the variable phase shifter and the variable resistance;
the variable phase shifter comprises:
a hybrid coupler comprising an eighth port, a ninth port, a tenth port, and an eleventh port;
a first varactor diode; and
a second varactor diode;
the eighth port of the hybrid coupler is coupled to the fourth port of the first directional coupler;
the ninth port of the hybrid coupler is coupled to an anode of the first varactor diode;
the tenth port of the hybrid coupler is coupled to an anode of the second varactor diode;
a cathode of the first varactor diode and a cathode of the second varactor diode are coupled to a phase control input;
the variable resistance comprises:
a capacitor comprising a first terminal and a second terminal, the first terminal being coupled to the eleventh port of the hybrid coupler; and
a PIN diode;
the anode of the PIN diode is coupled to the second terminal of the capacitor and an amplitude control input; and
the cathode of the PIN diode is coupled to ground.

5. The full duplex radio apparatus according to claim 2, wherein:
the variable impedance component comprises the variable phase shifter and the variable resistance;
an input of the variable phase shifter is coupled to the fourth port of the first directional coupler;
an input of the variable resistance is coupled to an output of the variable phase shifter; and
an output of the variable resistance is coupled to ground.

6. The full duplex radio apparatus according to claim 4, wherein:
the controller is configured to tune the variable impedance of the variable impedance component by at least one of:
adjusting an amplitude of a phase control signal applied to the phase control input; or
adjusting an amplitude of a voltage control signal applied to the amplitude control input.

7. The full duplex radio apparatus according to claim 1, wherein:
the variable impedance component comprises a variable delay line and a variable attenuator;
an input of the variable delay line is coupled to the fourth port of the first directional coupler;
an output of the variable delay line is coupled to an input of the variable attenuator; and
an output of the variable attenuator is connected to ground.

8. The full duplex radio apparatus according to claim 1, wherein:
the variable impedance component comprises:
a power splitter comprising: an eighth port, a ninth port, and a tenth port;
a variable delay line; and
a variable attenuator;
the eighth port of the power splitter is coupled to the fourth port of the first directional coupler;
the ninth port of the power splitter is coupled to an input of the variable delay line;
the tenth port of the power splitter is coupled to an input of the variable attenuator; and
an output of the variable delay line is coupled to an output of the variable attenuator.

9. The full duplex radio apparatus according to claim 1, wherein:
the transmit path is configured to transmit the transmit signal via the antenna; and
the receive path is configured to receive the received signal via the antenna.

10. The full duplex radio apparatus according to claim 9, wherein:
the self-interference cancellation circuit comprises:
a variable attenuator;
a variable phase shifter; and
a signal combiner comprising a first input, a second input, and a first output;
the seventh port of the second directional coupler is coupled to an input of the variable attenuator;
an output of the variable attenuator is coupled to an input of the variable phase shifter;
an output of the variable phase shifter is coupled to the first input of the signal combiner;
the third port of the first directional coupler is coupled to the second input of the signal combiner; and the first output of the signal combiner is coupled to the first receive path.

11. The full duplex radio apparatus according to claim 10, further comprising a circulator, the circulator comprising an eighth port, a ninth port, and a tenth port, wherein:
   the eighth port of the circulator is coupled to the sixth port of the second directional coupler;
   the ninth port of the circulator is coupled to the antenna; and
   the tenth port of the circulator is coupled to the first port of the first directional coupler.

12. The full duplex radio apparatus according to claim 10, wherein:
   the transmit path comprises a power amplifier;
   the first receive path comprises a second radio frequency limiter and a first low noise amplifier; and
   the second receive path further comprises a second low noise amplifier.

13. The full duplex radio apparatus according to claim 1, wherein the first receive path is used for full duplex operation.

14. A radar comprising the full duplex radio apparatus according to claim 1.

15. A weather radar comprising the full duplex radio apparatus according to claim 1.

* * * * *